US011457357B2

(12) United States Patent
Chanduri et al.

(10) Patent No.: US 11,457,357 B2
(45) Date of Patent: Sep. 27, 2022

(54) DEVICE SELF-CALIBRATION AND COMPONENT RESOLUTION

(71) Applicant: NCR Corporation, Atlanta, GA (US)

(72) Inventors: Anand Chanduri, Hyderabad (IN); Naresh Tummanapalli, Hyderabad (IN)

(73) Assignee: NCR Corporation, Atlanta, GA (US)

( * ) Notice: Subject to any disclaimer, the term of this patent is extended or adjusted under 35 U.S.C. 154(b) by 195 days.

(21) Appl. No.: 16/662,859

(22) Filed: Oct. 24, 2019

(65) Prior Publication Data

US 2021/0127263 A1 Apr. 29, 2021

(51) Int. Cl.

| | |
|---|---|
| ***G06K 5/00*** | (2006.01) |
| ***H04W 12/06*** | (2021.01) |
| ***G06K 7/14*** | (2006.01) |
| ***G06K 7/12*** | (2006.01) |
| ***G06Q 20/20*** | (2012.01) |
| ***G06F 13/10*** | (2006.01) |
| ***H04W 4/80*** | (2018.01) |
| ***G06Q 20/18*** | (2012.01) |
| ***H04W 12/47*** | (2021.01) |

(52) U.S. Cl.

CPC .......... *H04W 12/06* (2013.01); *G06F 13/102* (2013.01); *G06K 7/12* (2013.01); *G06K 7/1417* (2013.01); *G06Q 20/18* (2013.01); *G06Q 20/20* (2013.01); *H04W 4/80* (2018.02); *H04W 12/47* (2021.01); *G06F 2213/3854* (2013.01)

(58) Field of Classification Search

CPC ... G06F 3/0482; H04W 4/80; G06Q 30/0269; G06T 1/0064

USPC .......................... 713/168; 235/380, 382, 383

See application file for complete search history.

(56) References Cited

U.S. PATENT DOCUMENTS

| | | | | |
|---|---|---|---|---|
| 7,260,221 | B1 * | 8/2007 | Atsmon | H04M 1/2155 380/247 |
| 8,549,600 | B2 * | 10/2013 | Shedrinsky | A61B 5/002 726/7 |
| 10,210,502 | B2 * | 2/2019 | Filler | G06F 3/04883 |
| 2014/0100973 | A1 * | 4/2014 | Brown | G06Q 20/3274 705/17 |
| 2016/0370220 | A1 * | 12/2016 | Ackley | G01B 11/04 |
| 2019/0213369 | A1 * | 7/2019 | Ackley | H04N 1/00334 |
| 2019/0227553 | A1 * | 7/2019 | Kentley-Klay | B60L 15/20 |

* cited by examiner

*Primary Examiner* — Daniel St Cyr

(74) *Attorney, Agent, or Firm* — Schwegman, Lundberg & Woessner

(57) ABSTRACT

Events generated from a terminal are analyzed and a problem associated with a component peripheral of the terminal is identified. Operations and parameters to the operation are obtained to resolve the problem. The operations and parameters are encoded in a code along with security information. The code is provided to a mobile device. The mobile device provides the code back to the terminal. The terminal verifies the security information from the code and decodes the operations and parameters. The operations with the parameters are processed to resolve the problem on the terminal, and the security information and code are logged for auditing.

19 Claims, 4 Drawing Sheets

DEVICE SELF-CALIBRATION AND COMPONENT RESOLUTION

BACKGROUND

A number of technologies exists for managing problems encountered by network devices. Some of these technologies permit remote diagnosis and remote login to a device for resolution. However, certain types of devices are subject to more oversight and regulations than other devices, such as transaction devices.

With transaction devices, device calibration may be required during problem resolution and manually verified by an engineer physically present at the device; sometimes documented evidence must be provided by an engineer to indicate how the device was serviced and how the problem was resolved.

This is inefficient and time consuming for organizations that are required to provide maintenance and support of the transaction devices and results in minor problems that can cause the transaction terminals to be offline and inaccessible to customers for extended periods of time while the appropriate service engineer is dispatched to the problem devices.

Some problems encountered by transaction devices can be resolved by simply reapplying standard calibration settings to the devices, but the settings have to be manually verified after being applied by designated device-support personnel that are present at the devices. Unfortunately, retailers do not employ device-support personnel and typically rely on third-party support vendors; further, the lack of employed support personnel is likely intentional on the part of the retailers in order to limit retailer liability and to maintain service agreements with device manufacturers.

Since customers are performing transactions on transaction devices, procedures, regulations, and sometimes laws require proper authentication and documentation when such settings are re-applied to ensure that retailers are not engaged in fraud against their customers. For example, fuel pumps dispense fuel based on calibration of the fuel-flow rates being dispensed, if it is not document and verified when the pump was recalibrated, how it was recalibrated, and by whom recalibration was performed, the retailer may be accused of fraud if the fuel amount being charged to the customer does not match what is actually dispensed when randomly tested by regulators. The same is true with produce scales interfaced to Self-Checkout stations that weigh produce at a defined price per pound. In fact, there are a variety of peripheral measuring devices associated with transaction devices, which when recalibrated require proof that the proper calibration steps were processed by only authorized personnel.

SUMMARY

In various embodiments, methods and a system for device self-calibration and component resolution are presented.

According to an aspect, a method for device self-calibration and component resolution is presented. A code is obtained from a mobile device and security information that encoded in the code is verified. Operation and parameters encoded in the code are identified and the operations with the parameters are processed on a terminal to resolve a problem being experienced on the terminal. The operations with the parameters and the security information are logged on the terminal.

DETAILED DESCRIPTION

Figure 1:
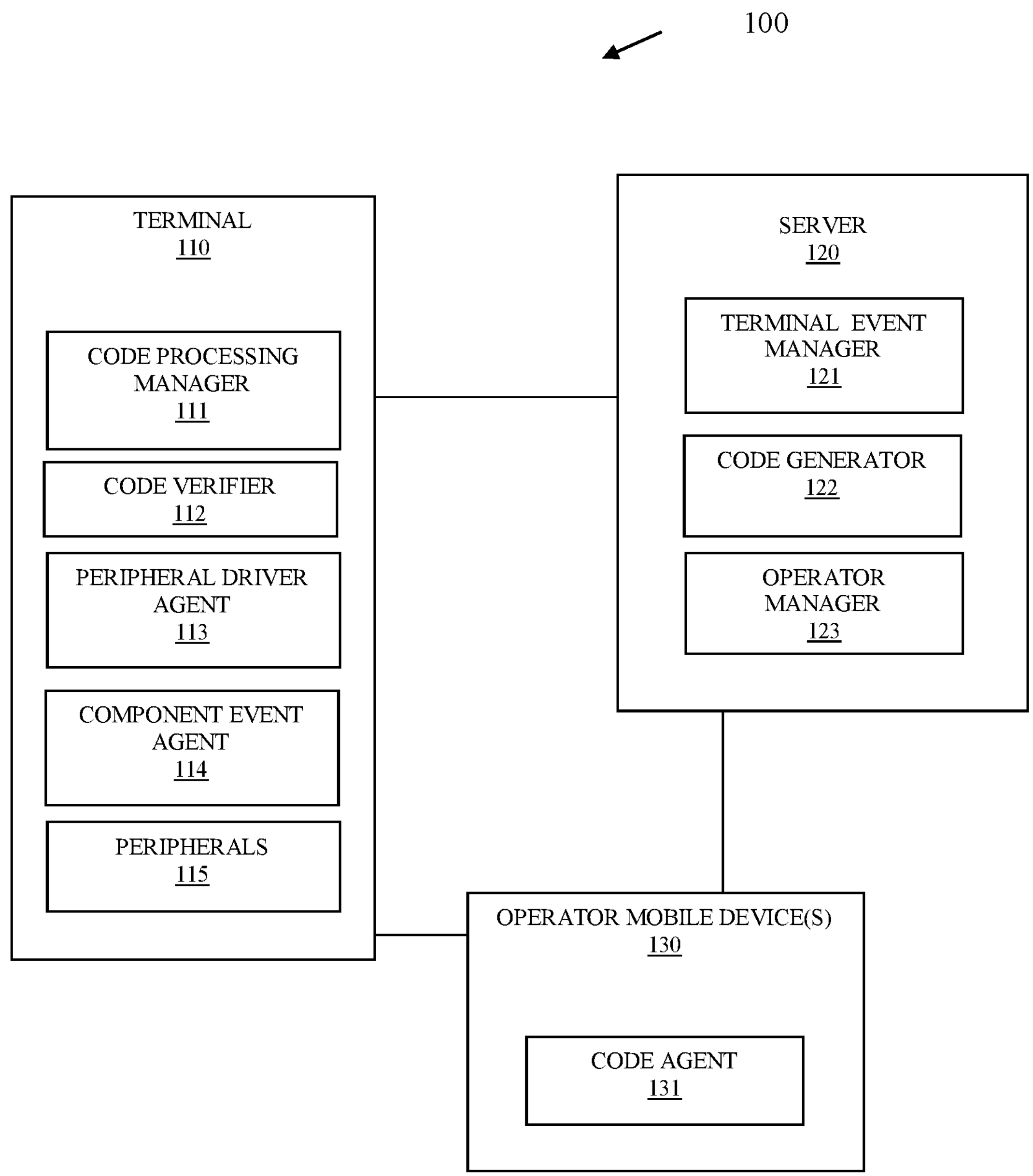
FIG. 1 is a diagram of a system for device self-calibration and component resolution, according to an example embodiment.

FIG. 1 is a diagram of a system 100 for device self-calibration and component resolution, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of device self-calibration and component resolution presented herein and below.

The system includes a transaction terminal 110, a server 120 and a plurality of operator mobile devices 130. Each device 110, 120, and 130 include their own processors and non-transitory computer-readable storage media comprising executable instructions representing: 1) for terminal 110: a code processing manager 111, a code verifier 112, a peripheral driver agent 113, a component event agent 114, and a plurality of peripheral devices 115; 2) for server 120: a terminal event manager 121, a code generator 122, and an operator manager 123; and 3) for mobile device 130: a code agent 131.

The executable instructions when executed by the processors of the corresponding devices 110, 120, and 130 perform the processing discussed herein and below with respect to: code processing manager 111, code verifier 112, peripheral driver agent 113, component event agent 114, peripheral devices 115, terminal event manager 121, code generator 122, operator manager 123, and code agent 131.

It is noted that although a single terminal 110 is illustrated that this is done for illustration as a single enterprise/store may deploy multiple terminals 110 managed by server 120 in connection with a plurality of operator mobile devices 130.

As will be demonstrated more completely herein and below, system 100 permits self-calibration and/or self-component resolution of peripherals 115 for terminal 110 in a manner that is verifiable, secure, and capable of being audited for purposes of complying with any existing regulation or procedure and without requiring only designated support personnel associated with a support organization that services the terminal 110 to be physically present at terminal 110 during calibration or component resolution.

During operation of terminal 110, component event agent 114 reports peripheral events to terminal event manager 121. These events are with respect to operation, actions, state, and status of peripherals 115 and terminal 110. Terminal event manager 121 determines based on the events when a problem is encountered requiring service. Each problem is mapped to a predefined set of operations that have to be processed on terminal 110 in order to resolve a specific problem. If the set of operations, do not require any verification or in-person service audit trail of a service personnel applying the operations to terminal 110, terminal event manager 121 may send the operations over a network connection to peripheral driver agent 113. Peripheral driver agent 113 then processes the operations on terminal 110 to resolve the problem.

However, when the type of problem is associated with a peripheral 115 that requires verification of auditing of an authorized support person, then terminal event manager provides the necessary operations to code generator 122. Code generator 122 encodes the operation along with security verification information that can be authenticated and verified by code verifier 112. The security verification information 112 provides audit information that can be mapped back to terminal event manager, the identified problem, the events that precipitated the problem identification, and the operations that need to be performed on terminal 110 to resolve the problem.

The encoded operations having the security information are provided from code generator 122 to operator manager 123. Operator manager 123 maintains a list of staff present at terminal 110 for a retailer along with a mobile device identifier or email address. The encoded operations with the security information are sent to code agent 131 of a registered device 130. Code agent 131 then communicates the encoded operations having the security information to code verifier 112 of terminal 110. This communication can be through a Near Field Communication (NFC) tap or by displaying the encoded information with security information as a Quick Response (QR) code a display of device 130 where an operator of device 130 presents the encoded information with security information to a camera or scanner peripheral device 115 of terminal 110. Code processing manager 111 the decodes the security information as the operations/commands that are required to be processed on terminal 110 to resolve the problem (which was encountered) and provides the security information to code verifier 112. Code verifier 112 authenticates the security information and logs the security information in a log on terminal 110.

Once code verifier 112 has authenticated the security information, code processing manager 111 provides the operations for processing to peripheral driver agent 113. Peripheral driver agent 113 includes an Application Programming Interface (API) to issue driver commands/operations directly to the peripherals 115. The peripherals 115 then processing the operations/commands provided by peripheral driver agent 113. Required acknowledgments for any calibration or settings applied by peripherals 115 during processing of the operations are presented to the operator of device 130. The acknowledgments are recorded in a log for auditing with the verified security information. The code may also be stored in the log for auditing.

The system 100 permits traceable and auditable operations for component resolution of peripherals 115 associated with transaction terminal 110 to be automatically identified and processed through code agent 131 by an operator that does not have to be a skilled or licensed technician of terminal 110. Because of the traceability, verification, and auditability of the above-mentioned process, regulations and support agreements associated with terminal 110 can be maintained while using a less skilled or any staff associated with a retailer of terminal 110 to quickly and efficiently resolve component problems of terminal 110. In this way, terminal 110 can experience higher availability to customers of the retailer, since skilled technicians are not required for certain component resolutions to be physically present at terminal 110.

In an embodiment, the code produced by code generator 122 is a QR code that includes implicit features as the security information. The implicit features are only detectable when code verifier 112 applies an infrared filter to the presented QR code by code agent 131. In an embodiment, the implicit features are color attributes embedded in the QR code. In an embodiment, terminal 110 includes an infrared light source that illuminates the display screen and QR code presented on display of the mobile device 130 by agent 131 before capturing an image of the QR code. The QR code includes explicit information that comprises the operations and metadata settings for any calibration of the peripherals 115 defined in the operations. The implicit information is used to authenticate the security information. In an embodiment, the color attributes exposed by the infrared filter to the code verifier represent an encryption of specific security information, such as an identifier for code generator 122, an identifier for device 130, an identifier for terminal 110, identifiers for the operations, and/or keys or digital signatures for server 120 and/or mobile device 130.

In an embodiment, the code produced by code generator 122 is an NFC encoded data structure that includes explicit information representing the operations and metadata calibration settings used by the operations for a specific peripheral 115. The NFC encoded data structure also includes implicit information representing the security information, which may be encrypted, and which may include identifiers, keys, and/or digital signatures as discussed above with the QR embodiment of the code.

In an embodiment, once an operator uses code agent 131 to convey the code to code processing manager 112 and the code is verified by code verifier and the operations are processed on peripherals 115 by peripheral driver agent 113, terminal 110 may still be experiencing problems with the corresponding peripheral 115 or with a different peripheral 115. In such embodiments, event agent 114 sends the appropriate events indicating the problems and event manager 121 re-maps the new events to a new set of operations and/or meta data having new settings for the same peripheral 115 that originally experienced problems or for a different peripheral 115 that is now experience a problem after the initial operations were processed to resolve the first or original problem. Code generator 122 generates a new code with encoded operations and metadata, provides to operator manager 123, and operator manager 123 sends to code agent 131 of mobile device 130. The operator then uses code agent 131 to communicate the new code to code processing manager 111, and the process repeats. This ensures that multiple problems can be resolved with just the presence of a non-technician operator or employee of the retailer, each problem resolved in an automated fashion that does not require a skilled technician, and each problem resolution logged for authenticity, verification, and auditability to comply with any regulations and support agreements associated with terminal 110.

In an embodiment, the operations are encoded in the code with appropriate calibration settings for peripherals 115 associated with measuring a good being purchased from the customer, such as a weigh scale, a fuel pump, and others.

In an embodiment, the operations are encoded in the code with appropriate calibration settings for a peripheral 115 associated with a touch-screen display of terminal 110.

In an embodiment, the operations are encoded in the code with appropriate calibration settings for peripherals 115 associated with scanning item barcodes for items being purchased by the customer at terminal 110.

In an embodiment, the operations are encoded in the code for peripherals 115 associated with a receipt printer of terminal 110, such operations can include forcing a media ejection that may be jammed in the receipt printer.

In an embodiment, when code processing manager 111 obtains a code from device 130, code processing manager 111 places terminal 110 in an administrative mode of operation. That is, code processing manager 111 upon identifying that the code is of a type that includes component resolution operations and/or corresponding metadata calibration settings for a given peripheral 115 takes transaction terminal 110 from a customer transaction mode of operation to an administrative mode of operation during which terminal 110 allows administrative operations on peripherals 115.

In an embodiment, code processing manager 111 identifies operations, peripherals 115, and parameters used by the operations from the code from the encoded data of the code. The parameters can include metadata, such as calibration or other settings that are to be applied by the operations on a given peripheral 115. Driver agent 113 uses an API of the appropriate peripheral 115 and the parameters to issue the operations and parameters to the peripherals 115 for execution by processors associated with the peripherals 115. In an embodiment, the operations and parameters are processed by a driver the executes on terminal 110 to configure and resolve a problem on the given peripheral 115.

In an embodiment, code processing manager 111 identifies a reference to a file or document within the encoded data of the code. The reference may be resolved locally on terminal 110 to obtain the file or document or the reference may indicate that the file or document is to be obtained from event manager 121 and/or from code agent 131. If the file or document is identified as an external reference (external to terminal 110) and associated with device 130, an interface screen may be displayed on terminal 110 instructing operator of device 130 on how the file or document can be provided to code processing manager, such as through wireless transmission and or by presenting an image of the file or document to a camera of terminal 110. The file or document may be associated with calibration settings for a given peripheral 115 and obtained by code processing manager 111 as a parameter required by an operation represented in the encoded data of the code. In some cases, as was discussed above all necessary calibration settings may be embedded in the encoded data of the code itself.

In an embodiment, terminal 110 is a Self-Service Terminal (SST), a Point-Of-Sale (POS) terminal, a kiosk, or a Self-Service checkout terminal.

In an embodiment, mobile device 130 is a laptop, a tablet, a phone, or a wearable processing device.

In an embodiment, server 120 is one of a collection of servers 120 that logically cooperate as a cloud processing environment (cloud).

In an embodiment, terminal event manager 121 automatically initiates the above-noted processing once an automated attempt to resolve a problem with a peripheral 115 of terminal 110 fails because of a regulation or support agreement requirement that the needed operations required skilled support staff to be present at terminal 110 for execution of the operations and verification of any applied settings by a person present at terminal 110 after execution of the operations.

These and other embodiments are now discussed with reference to the FIGS. 2-4.

Figure 2:
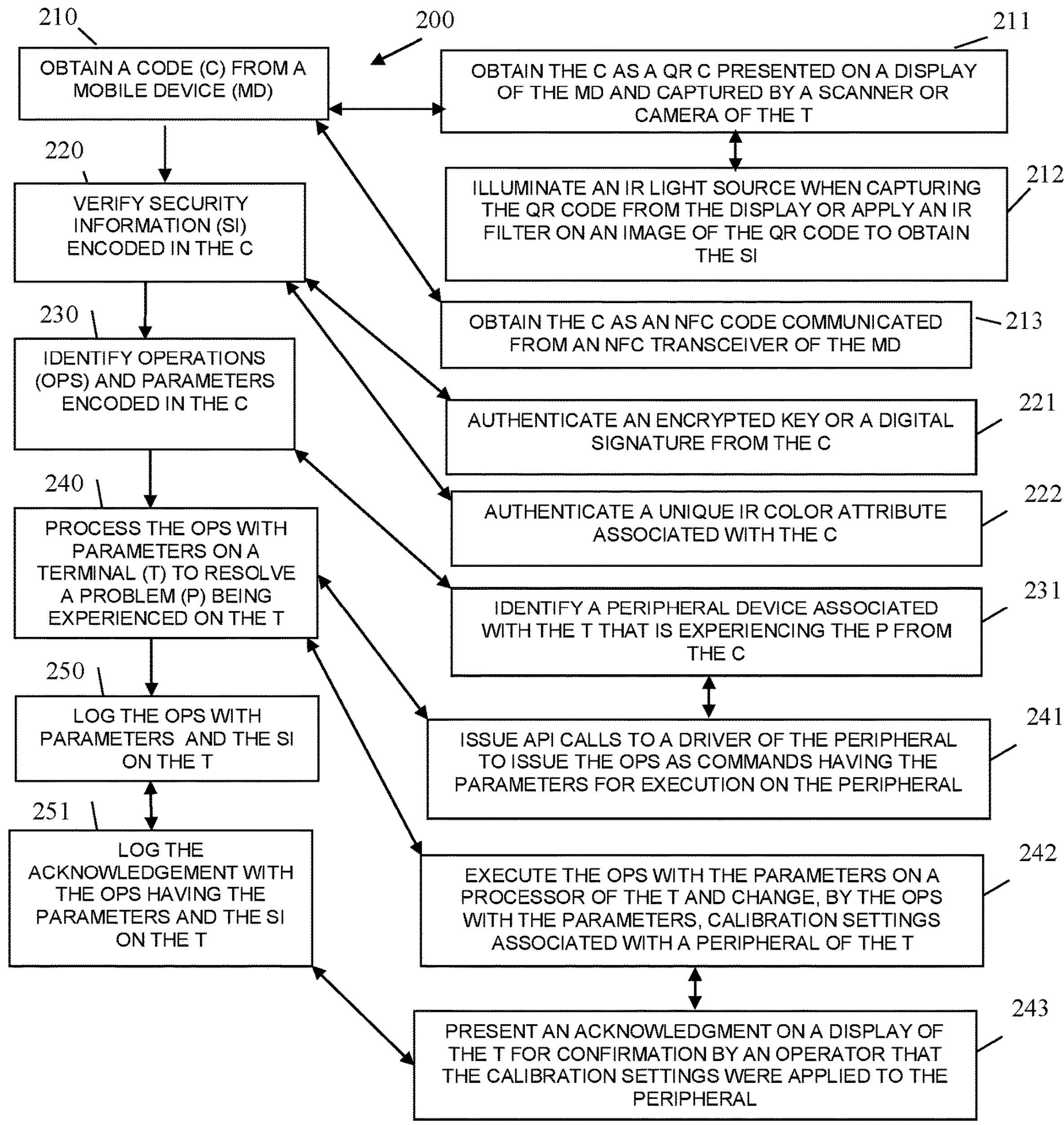
FIG. 2 is a diagram of a method for device self-calibration and component resolution, according to an example embodiment.

FIG. 2 is a diagram of a method 200 for device self-calibration and component resolution, according to an example embodiment. The software module(s) that implements the method 200 is referred to as an "terminal problem resolver and verifier." The terminal problem resolver and verifier is implemented as executable instructions programmed and residing within memory and/or a non-transitory computer-readable (processor-readable) storage medium and executed by one or more processors of a device. The processor(s) of the device that executes the terminal problem resolver and verifier are specifically configured and programmed to process the terminal problem resolver and verifier. The terminal problem resolver and verifier may include one or more wireless network connections during operation.

In an embodiment, the device that executes the terminal problem resolver and verifier is terminal 110. In an embodiment, terminal 110 is an SST, a POS terminal, a kiosk, or a Self-Service checkout terminal.

In an embodiment, the terminal problem resolver and verifier is all of or some combination of: code processing manager 111, code verifier 112, peripheral driver agent 113, and/or component event agent 114.

At 210, the terminal problem resolver and verifier obtains a code from a mobile device 130. This can occur in a variety of manners.

For example, at 211, the terminal problem resolver and verifier obtains the code as a QR code presented on a display of the mobile device and captured by a scanner or a camera of the terminal 110.

In an embodiment of 211 and at 212, the terminal problem resolver and verifier illuminates an IR light source when capturing the QR code from the display or applies an IR filter on an image of the QR code to obtain the security information.

In another case, at 213, the terminal problem resolver and verifier obtains the code as an NFC code communicated from an NFC transceiver of the mobile device to the terminal 110.

At 220, the terminal problem resolver and verifier verifies security information encoded in the code.

In an embodiment, at 221, the terminal problem resolver and verifier authenticates an encrypted key or a digital signature from the code.

In an embodiment, at 222, the terminal problem resolver and verifier authenticates a unique Infrared (IR) attribute associated with the code (implicit information or data provided with the code).

At 230, the terminal problem resolver and verifier identifies operations and parameters encoded in the code.

In an embodiment, at 231, the terminal problem resolver and verifier identifies a peripheral device associated with the terminal that is experiencing the problem from the code.

At 240, the terminal problem resolver and verifier processes the operations with the parameters on a terminal to resolve a problem being experienced by on the terminal.

In an embodiment of 231 and 240, at 241, the terminal problem resolver and verifier issues API calls to a driver of the peripheral to issue the operations as commands having the parameters for execution on the peripheral.

In an embodiment, at 242, the terminal problem resolver and verifier executes the operations with the parameters on a processor of the terminal. The operations with the parameters cause calibration settings associated with a peripheral of the terminal to be changed.

In an embodiment of 242 and at 243, the terminal problem resolver and verifier presents an acknowledgment on a display of the terminal for confirmation by an operator that the calibration settings were applied to the peripheral.

At 250, the terminal problem resolver and verifier logs the operations with the parameters and the security information within a log on the terminal.

In an embodiment of 243 and 250, at 251, the terminal problem resolver and verifier logs the acknowledgment with the operations having the parameters and the security information within the log on the terminal.

In an embodiment, the peripheral of the terminal that is experiencing a problem may include: a touchscreen display, a non-touchscreen display, a printer, a weigh scale, a scanner, a fuel rate dispenser measuring device, a card reader, a currency and/or coin dispenser, a cash drawer, etc.

Figure 3:
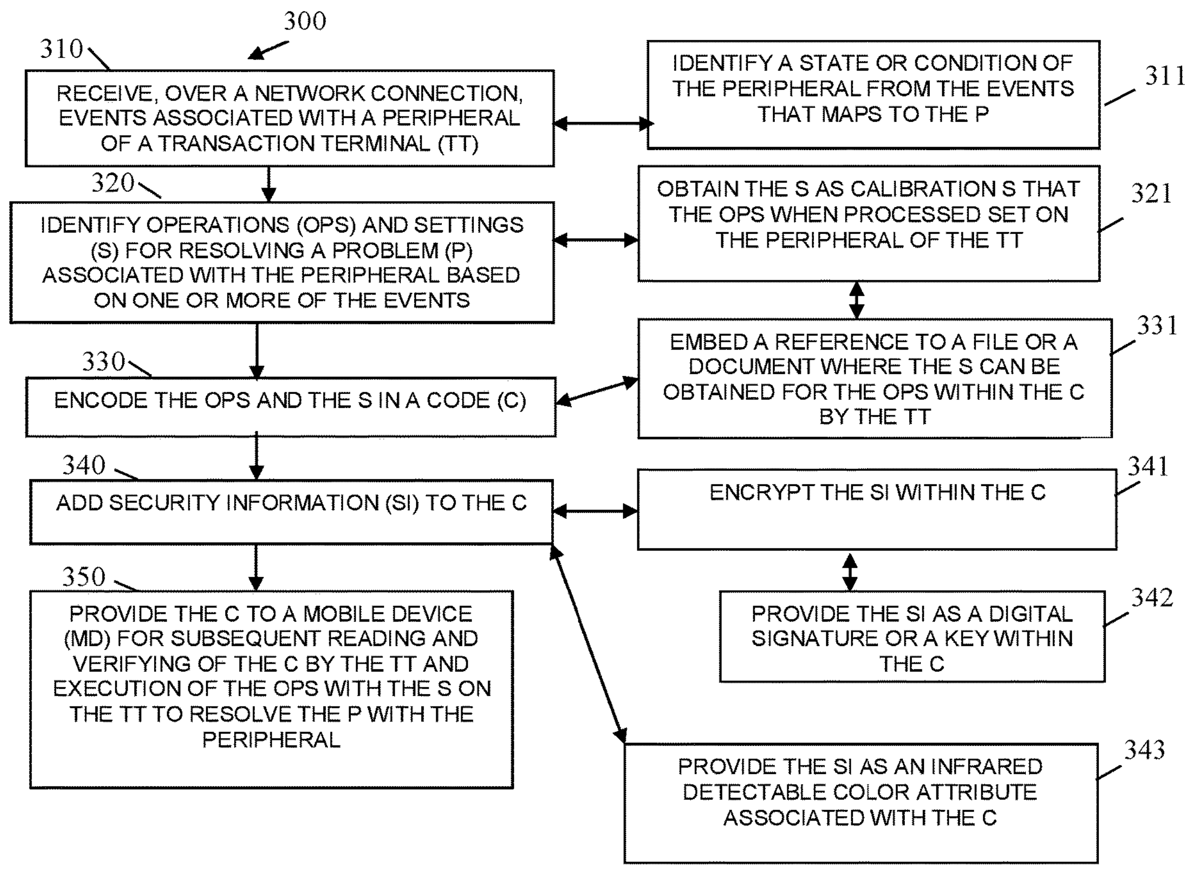
FIG. 3 is a diagram of another method for device self-calibration and component resolution, according to an example embodiment.

FIG. 3 is a diagram of another method 300 for device self-calibration and component resolution, according to an example embodiment. The software module(s) that implements the method 300 is referred to as a "server-based terminal problem manager." The server-based terminal problem manager is implemented as executable instructions programmed and residing within memory and/or a non-transitory computer-readable (processor-readable) storage medium and executed by a device. The processors that execute the server-based terminal problem manager are specifically configured and programmed to process the server-based terminal problem manager. The server-based terminal problem manager includes one or more network connections during its processing. Any network connections to the device can be wired, wireless, or a combination of wired and wireless.

In an embodiment, the device that executes the server-based terminal problem manager is server 120. In an embodiment, the server 120 is a local server that is physically located within a store. In an embodiment, the server 120 is part of a cloud processing environment (cloud).

In an embodiment, the server-based terminal problem manager is all or some combination of terminal event manager 121, code generator 122, and/or operator manager 123.

The processing of the server-based terminal problem manager as shown in FIG. 3 represents interaction between terminal 110 (including method 200 of FIG. 2) and device 130.

At 310, the server-based terminal problem manager receives, over a network connection, events associated with a peripheral of a transaction terminal 110.

In an embodiment, at 311, the server-based terminal problem manager identifies a state or a condition of the peripheral from the events, which map to a problem being experienced by the peripheral of the transaction terminal.

At 320, the server-based terminal problem manager identify operations and settings for resolving the problem associated with the peripheral based on one or more of the events.

In an embodiment, at 321, the server-based terminal problem manager obtains the settings as calibration settings that the operations when processed set on the peripheral of the transaction terminal.

At 330, the server-based terminal problem manager encode the operations and the settings in a code.

In an embodiment of 321 and 330, at 331, the server-based terminal problem manager embed a reference to a file or a document where the settings can be obtained for the operations within the code by the transaction terminal.

At 340, the server-based terminal problem manager adds security information to the code.

In an embodiment, at 341, the server-based terminal problem manager encrypts the security information with the code.

In an embodiment of 341 and at 342, the server-based terminal problem manager provides the security information as a digital signature or a key embedded within the code.

In an embodiment, at 343, the server-based terminal problem manager provides the security information as an IR detectable color attribute associated with the code.

At 350, the server-based terminal problem manager provides the code to a mobile device for subsequent reading and verifying of the code by the transaction terminal and execution of the operations with the settings on the transaction terminal for purposes of resolving the problem with the peripheral of the transaction terminal.

Figure 4:
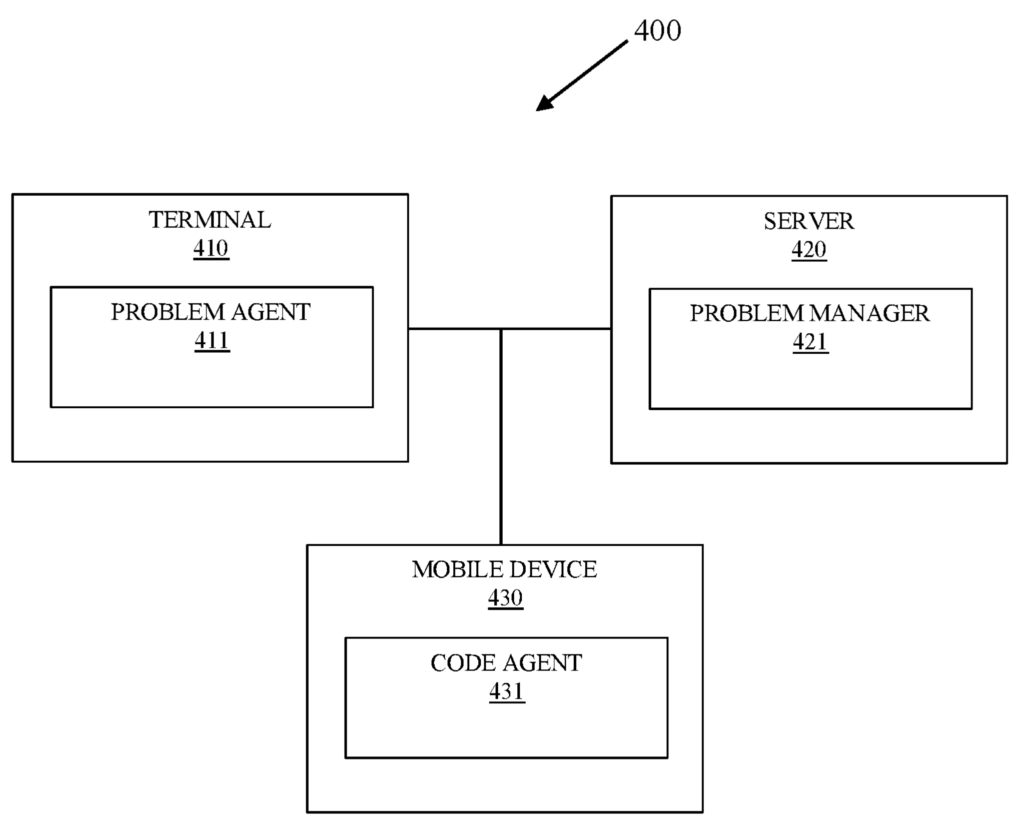
FIG. 4 is a diagram of another system for device self-calibration and component resolution, according to an example embodiment.

FIG. 4 illustrates a system 400 for device self-calibration and component resolution. The system 400 includes a variety of hardware components configured to execute software components. The system 400 has access to one or more network connections during processing of the software components. The network connections may be wired, wireless, or a combination of both wired and wireless.

In an embodiment, the system 400 is the system 100.

In an embodiment, the system 400 implements, inter alia, the processing discussed above with the FIGS. 1-3.

The system 400 includes: a terminal 410, a server 420, and a mobile device 430.

The terminal 410 comprising a terminal processor and a terminal non-transitory computer-readable storage medium having executable instructions representing a problem agent 411.

The problem agent 411 when executed by the terminal processor from the terminal non-transitory computer-readable storage medium causes the terminal processor to: 1) send events raised by a peripheral of the terminal 410 to the problem manager 421; 2) obtain a code provided by the code agent 431; 3) verify security information present in the code; 4) decode operations and settings from the code when verified; 5) process the operations and settings on the peripheral; 6) record an acknowledgment that the settings were applied on the peripheral from an operator associated with the mobile device 430; and 7) log the operations, settings, security information, and acknowledgement within a log of the terminal.

The server 420 comprising a server processor and a server non-transitory computer-readable storage medium having the problem manager 421.

The problem manager 421 when executed by the server processor from the server non-transitory computer-readable storage medium comprises the server processor to: 1) receive the events for the peripheral from the problem agent 411; 2) map the events to the operations and the settings; 3) generate the security information; 4) encode the operations, the settings, and the security information in the code; and 5) send the code to the code agent 431.

The mobile device 430 comprising a mobile processor and a mobile non-transitory computer-readable storage medium having executable instructions representing a code agent 431.

The code agent 431 when executed by the mobile processor from the mobile non-transitory computer-readable storage medium causes the mobile processor to: 1) receive the code from the problem manager 421; and 2) provide the code to the problem agent.

In an embodiment, the terminal 410 is terminal 110. In an embodiment, terminal 110 is an SST, a POS terminal, a kiosk, or a Self-Service checkout terminal.

In an embodiment, the problem agent is all of or some combination of: code processing manager 111, code verifier 112, peripheral driver agent 113, component event agent 114, and/or the method 200 of the FIG. 2.

In an embodiment, server 420 is server 120. In an embodiment, server 120 is part of a cloud processing environment (cloud).

In an embodiment, problem manager is all of or some combination of: terminal event manager 121, code generator 122, operator manager 123, and/or the method 300 of the FIG. 3.

In an embodiment, mobile device 430 is device 130. In an embodiment, device 130 is a tablet, a laptop, a phone, or a wearable processing device.

In an embodiment, code agent 431 is code agent 131.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:

sending, by a terminal, events raised by a peripheral of the terminal to a server, wherein the server receives the events from the terminal, maps the events to operations and settings associated with the peripheral, generates security information, encodes the operations, the settings and the security information in a code, and the server sends the code to a mobile device;

obtaining, by the terminal, the code from the mobile device, wherein the mobile device receives the code from the server and provided the code to the terminal;

verifying, by the terminal, security information encoded in the code by applying an infrared (IR) filter to the code, obtaining a digital signature for the mobile device, decoding the code after applying the IR filter, and verifying the digital signature of the mobile device;

identifying, by the terminal, the operations and the settings encoded in the code;

processing, by the terminal, the operations with the settings with the peripheral of the terminal to resolve a problem being experienced on the terminal; and logging, by and on the terminal, the operations, the settings, the security information, and an acknowledgment from an operator of the mobile device that the operations and the settings were processed on the terminal.

2. The method of claim 1, wherein obtaining further includes obtaining the code as a Quick Response (QR) code presented on a display of the mobile device and captured by a scanner or camera of the terminal.

3. The method of claim 2, wherein obtaining further includes illuminating an Infrared (IR) light source when capturing the QR code from the display or applying the IR filter on an image of the QR code to obtain the security information.

4. The method of claim 1, wherein obtaining further includes obtaining the code as a Near Field Communication (NFC) code communicated from an NFC transceiver of the mobile device to the terminal.

5. The method of claim 1, wherein verifying further includes authenticating an encrypted key from the code.

6. The method of claim 1, wherein verifying further includes authenticating a unique Infrared (IR) color attribute associated with the code.

7. The method of claim 1, wherein identifying further includes identifying the peripheral associated with the terminal that is experiencing the problem from the code.

8. The method of claim 7, wherein processing further includes issuing Application Programming Interface (API) calls to a driver of the peripheral to issue the operations as commands having the settings for execution on the peripheral.

9. The method of claim 1, wherein processing further includes executing the operations with the settings on a processor of the terminal and changing, by the operations with the settings, calibration settings associated with the peripheral of the terminal.

10. The method of claim 9, wherein executing further includes presenting an acknowledgement on a display of the terminal for confirmation by the operator that the calibration settings were applied to the peripheral.

11. A method, comprising:

receiving, by a server and over a network connection, events associated with a peripheral of a transaction terminal;

identifying, by the server, operations and settings for resolving a problem associated with the peripheral based on one or more of the events;

encoding, by the server, the operations and the settings in a code;

adding, by the server, security information to the code that is only visible when an image of the code is captured and an Infrared (IR) filter is applied to the image, and wherein at least a portion of the security information comprises a digital signature of a mobile device; and providing, by the server, the code to the mobile device, wherein the mobile device provides the code to the transaction terminal and the transaction terminal verifies the digital signature, applies the Infrared filter to the code, verifies the security information, decodes the code and obtains the operations and the settings for the peripheral, processes the operations with the settings on or on behalf of the peripheral to resolve the problem with the peripheral, obtains an acknowledgment from an operator of the mobile device that the operations with the settings were processed for the peripheral, and logs on the transaction terminal the operations, the settings, the security information, and the acknowledgement.

12. The method of claim 11, wherein receiving further includes identifying a state or a condition of the peripheral from the events that maps to the problem.

13. The method of claim 11, wherein identifying further includes obtaining the settings as calibration settings that the operations when processed set on the peripheral of the transaction terminal.

14. The method of claim 13, wherein encoding further includes embedding a reference to a file or a document where the settings can be obtained for the operations within the code by the transaction terminal.

15. The method of claim 11, wherein adding further includes encrypting the security information within the code.

16. The method of claim 15, wherein encrypting further includes providing the security information as a key within the code.

17. The method of claim 11, wherein encrypting further includes provide the security information as an IR detectable color attribute associated with the code.

18. A system, comprising:

a terminal comprising a terminal processor and a terminal non-transitory computer-readable storage medium having executable instructions representing a problem agent;

a server comprising a server processor and a server non-transitory computer-readable storage medium having executable instructions representing a problem manager;

a mobile device comprising a mobile processor and a mobile non-transitory computer-readable storage medium having executable instructions representing a code agent;

the problem agent when executed by the terminal processor from the terminal non-transitory computer-readable storage medium causes the terminal processor to:

send events raised by a peripheral of the terminal to the problem manager;

obtain a code provided by the code agent;

verify security information present in the code by applying an infrared (IR) filter to the code, obtaining a digital signature for the mobile device and decoding the code decoded after applying the IR filter, and verifying the digital signature of the mobile device;

decode operations and settings from the code when verified;

process the operations and settings on the peripheral;

record an acknowledgment that the settings were applied on the peripheral from an operator associated with the mobile device; and log the operations, settings, security information, and acknowledgement within a log of the terminal;

the problem manager when executed by the server processor from the server non-transitory computer-readable storage medium causes the server processor to:

receive the events for the peripheral from the problem agent;

map the events to the operations and the settings;

generate the security information;

encode the operations, the settings, and the security information in the code; and send the code to the code agent;

the code agent when executed by the mobile processor from the mobile non-transitory computer-readable storage medium causes the mobile processor to:

receive the code from the problem manager; and provide the code to the problem agent.

19. The system of claim 18, wherein the terminal is: a Self-Service Terminal, a Point-Of-Sale terminal, a kiosk, or a Self-Service checkout terminal, wherein the mobile device is: a laptop, a tablet, a phone, or a wearable processing device.

* * * * *